Dec. 20, 1932.                J. C. DAVIDSON                1,891,345
                            ELECTRICAL CONDENSER
                            Filed May 16, 1928
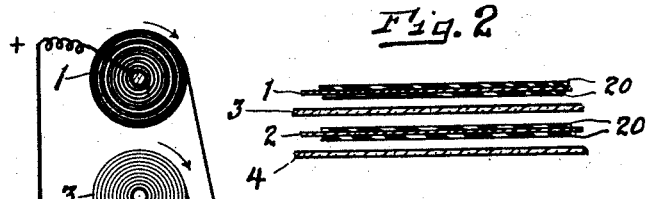
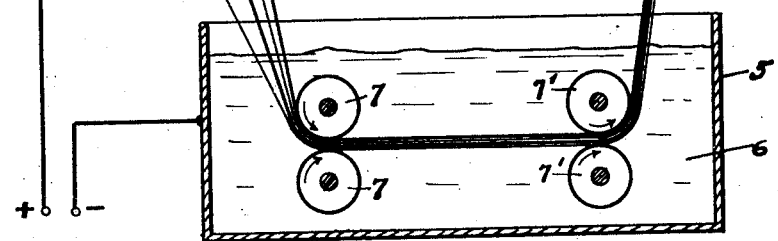
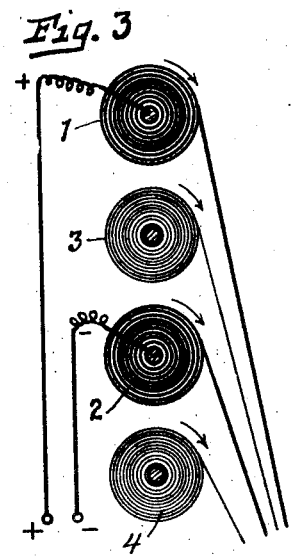
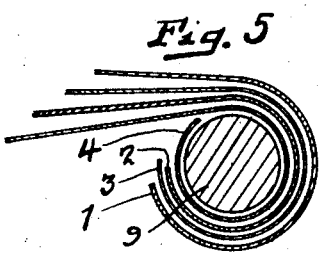
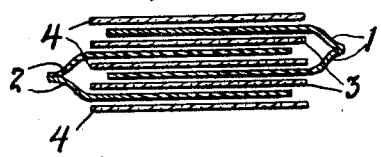
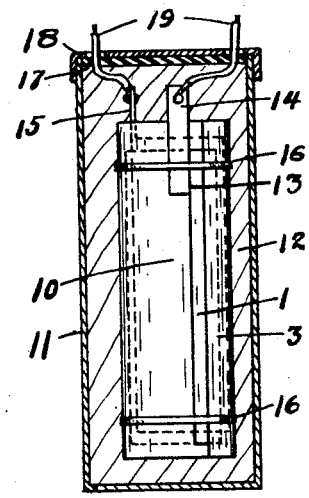
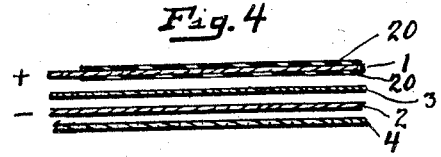
INVENTOR Patented Dec. 20, 1932

1,891,345

UNITED STATES PATENT OFFICE

JOHN CLYDE DAVIDSON, OF BROOKLYN, NEW YORK

ELECTRICAL CONDENSER

Application filed May 16, 1928. Serial No. 278,101.

This invention relates generally to chemical rectifying and impedance devices and method of making the same, and more particularly to a novel and improved capacitive reactance device or electrical condenser having a high capacity per unit volume, and which is rugged, durable, and capable of long and continuous operation in service.

In one embodiment of my invention I have applied the same to a condenser adapted for general use, and which is particularly well suited for use in radio filter and battery eliminator circuits. The advantage of using in an electrical condenser an exceedingly thin film which serves as a dielectric, such as that formed in electrolytic condensers, is well known. The disadvantages, however, of using a condenser which has a liquid electrolyte are obvious. Such condensers require constant attention in service, are comparatively bulky and cannot be placed in various positions as may be desired.

An object of my invention is, therefore, to produce a condenser in which the dielectric comprises an exceedingly thin film, and which condenser is dry for all practical purposes and has comparatively small volume per unit capacity.

Another object of my invention is to produce by a proper combination of chemicals a condenser of the type described which will have a long and useful life.

A further object of my invention is to provide a means for conserving the useful chemical or chemicals utilized which comprises a special preparatory operation in the manufacture of the condenser.

A further object of my invention is to prevent or minimize the loss of the useful chemical or chemicals when the condenser is in service.

An additional object of my invention is to prevent or minimize the loss of the useful chemical or chemicals due to primary battery action when the condenser is not in use, but is connected in a closed circuit.

Still another object of my invention is to prevent or minimize chemical action between the chemical or chemicals and the dielectric film employed, or between the chemical or chemicals and the metal electrodes of the condenser.

It is also an object of my invention to produce a condenser of the type described which will have a low current leakage loss.

Other and further objects and advantages of my invention will be apparent from the following description.

Heretofore in the art, electrolytic condensers have generally used a liquid, paste, or a jelly in combination with one or more film forming electrodes, and the presence of the water or moisture in the form necessary in this type of condenser has prevented the general use of such condensers, and is particularly objectionable when used in radio apparatus. Furthermore, the useful life of such condensers is relatively short due to various excessive losses, such as high leakage loss in operation, chemical reaction wherein the dielectric film is largely dissolved even when the condenser is not in use, and primary battery action which attacks the electrodes when a condenser is out of use but is connected to a closed external circuit. Condensers containing a liquid electrolyte are also objectionable because of their relatively large dimensions per unit capacity, creepage, corrosive action and the like.

In this invention I have reduced or replaced the liquid electrolyte by a relatively hard chemical mass containing water in combination therewith. I have found it preferable that the chemicals used should be neither very hygroscopic nor should they readily give up any water with which they may be combined, either in chemical combination, or otherwise.

For a better understanding of my invention, reference is made to the accompanying drawing disclosing one embodiment of my invention, in which like reference numerals indicate corresponding parts:

Figure 1 is a view of the general method of making a condenser according to my invention;

Figure 2 is an exploded view of the arrangement of elements in one modification;

Figure 3 illustrates an alternative arrangement of the electrical connections shown in Figure 1;

Figure 4 is an exploded view of the elements in a condenser made in accordance with the electrical arrangement of Figure 3;

Figure 5 is an end view disclosing the disposition of the various layers to form a wound condenser;

Figure 6 is a view of a finished condenser with its casing partly removed; and

Figure 7 illustrates a conventional stack condenser using the elements of my invention, the elements being separated to more clearly show their arrangement.

In the methods shown in Figs. 1 and 3 I prefer to use two relatively long, narrow metallic foils or electrodes 1, 2 separated by strips of porous or fibrous material, 3, 4, such as cotton cloth, muslin, paper, silk, linen and the like. At least one of the metallic foils must belong to the so-called film-forming class, such as aluminum and magnesium, which are capable of valve action. The supply stock comes in rolls which are rotatably mounted in any desired manner, as indicated at the left of the figures. Strips of aluminum foil 1, 2 and interposed strips of separating material 3, 4 are brought down together and passed through the solution 6 in the tank and then brought out, and either wound directly on a mandrel 9 as shown, or appropriate lengths of the strips are cut off to form a stack such as shown in Fig. 7. The pulleys or guides 7, 7', 8 may be mounted in any suitable manner and serve to keep the strips together and in alignment while passing through the forming solution 6 and onto the mandrel 9.

The solution in the tank 6 may be one of the various combinations later described and contains a certain amount of free water which may be heated, if desired, to insure uniform distribution of the chemical or chemicals throughout the separating materials 3 and 4. It is not necessary, however, that the solution be heated and, as long as the chemicals are properly dissolved, the solution may be cold during the processing of the condenser.

In the method of Fig. 1, a source of direct current is connected to a metallic tank 5 and the foils 1 and 2 as shown. It will be noted that the tank 5 is connected to the negative side of the supply current, while the two rolls of metal stock 1, 2 are connected to the positive side of the circuit. This forming current is thus passed through the foil members and the chemical solution and returns through the metallic tank to the negative side of the circuit, and results in a film being formed on each side of the metallic strips, such as shown by 20, 20 in Fig. 2. As is well-known, the films thus formed may be used as dielectric material in a condenser. During the time that the various strips pass through the solution, a film is formed as before stated on both of the foils, and the separating strips become thoroughly impregnated with the chemical. The assembly is then brought out directly above the tank in order that excess impregnating material may not be lost and is carried between the idle rollers or guides 8, 8 and wound on the mandrel 9 to form a condenser body.

When a sufficient number of turns to give the desired capacity are wound on the mandrel, the strips are cut off and the condenser preferably dipped in wax in order to coat at least the lower portion of the same to prevent bleeding or loss of the impregnating substance from the roll; it is obvious, however, that the coating process may be omitted if desired. While hardening of the impregnating substance usually begins early, the condenser roll when dipped in wax is not necessarily dry, and hardening may continue until the impregnating substance is a relatively solid mass. The substance retained between the electrodes serves to maintain the film formed on the electrodes during the life of the condenser.

While the films on the foils can be formed after the condenser is wound, this causes a certain amount of the impregnating material to be used up and consequently lost. Accordingly, it is preferable to apply the forming current to the foils while they are passing through the chemical solution. The wound condenser is ready for actual use at any voltage up to the formation voltage without further electrolytic action taking place. Obviously two different solutions could also be used, if desired, one of them serving as a film forming solution and the other as an impregnating solution. The films may also be formed by an alternating current if desired. It is also evident that the films could be formed in various ways other than that shown, such as by heating the foils in an oxidizing atmosphere, and afterward impregnating the condenser body.

The films 20, 20 are formed on each side of the foils 1, 2, as shown in Fig. 2, the thickness of the film being greatly exaggerated in the drawing in order that the same may be more clearly shown. This film has uni-directional current characteristics and, while it may pass a current in one direction, it effectually blocks any current in the opposite direction. The film thus may serve as the dielectric element of a condenser. When a condenser is to be used in an alternating current circuit it is preferable that both of the electrodes or foils be coated with this uni-directional film. If, however, the condenser is to be used in a direct current circuit only, it will be sufficient if but one of the foils is coated, as shown in Fig. 4, in which case the polarity of the condenser must be observed when connecting it in circuit. In the modification of Figs. 3 and 4 it is not necessary that the tank 5 through which the strips are passed be made of metal, since a source of direct current is connected directly across the foil members 1, 2, as shown in Fig. 3. In a direct current circuit, the film is formed only on foils which are made positive electrodes of the forming circuit, therefore, the foil 1 in Fig. 3 will have a film deposited on either side, while no film will be deposited on foil 2, as shown in Fig. 4.

The interposed porous separators 3, 4 are impregnated with a chemical substance which contains water in combination and which is sufficiently conductive to readily permit the flow of an electric current therethrough. It is well known that if a salt of a semi-solid substance containing water in combination has a vapor tension greater than that of the air with which it may be in contact it will give up its water entirely or else it will become a substance containing less water in combination and having a lower vapor tension than the air to which it is exposed. On the other hand, a substance having a vapor tension considerably less than that of the air to which it is exposed generally absorbs moisture from the air, and tends to form a solution, this process continuing until the dilution of the solution reduces the vapor tension to approximately that of the surrounding air. From this it will be seen that a substance subject to either of these actions will not be satisfactory for use in a condenser of the type described for it would either ultimately become dry, that is, lose all its water, and form a non-conducting medium, or else it would tend to become a liquid solution, thus defeating my effort to make a relatively dry condenser. While it is difficult to find a single substance whose equivalent vapor tension will exactly meet these requirements, it is relatively easy to combine two or more substances into a resultant substance which will have an effective vapor tension equivalent to the average vapor tension of the air with which it may come into contact. In the case of condensers subjected to conditions which are likely to cause a rise in temperature or the dissolution of some of the moisture present or of the water with which they may be combined, it is advisable to so proportion the chemical that it will slowly take up additional moisture from the air to compensate for that dissipated under these conditions.

It may readily be shown that the chemical films on the electrodes are attacked by most acids or alkalis so that, in order to minimize the chemical action required to rebuild the film, either while the condenser is in use or out of use, the chemical should be made as nearly neutral as is practically possible. This will also minimize the primary battery action which often occurs in condensers of this type due to the fact that they are connected to an external circuit, such as a transformer winding in an alternating current filter circuit.

It is also desirable, although not essential that the substance be of an adhesive nature in order to prevent separation of the interleaved elements, and I have taken this feature into consideration in selecting my preferred combination of chemicals.

I have also found it highly desirable to use an inorganic alkaline salt neutralized with an organic acid.

The capacity per unit area is also a function of the concentration of positive and negative ions in the substance. I, therefore, find it desirable to proportion my chemicals so that I will obtain an abundance of free ions. As these condensers are put into service at higher voltages, however, highly ionized chemicals tend to cause an increase in losses, and this feature must be taken into consideration.

I also proportion my chemicals in such manner as to reduce the current leakage loss in the condenser to a minimum.

Many satisfactory combinations of two or more base forming and acid forming chemicals may be used, but the combination is preferably effected in such manner that a substantial balance between bases and acids is maintained. Such combinations may comprise sodium borate, sodium carbonate, potassium hydroxide, sodium hydroxide, ammonium borate, malic acid, citric acid, acetic acid, oxalic acid, sodium phosphate, and various other chemicals in combination with water.

A preferred combination includes sodium carbonate, sodium borate, and malic acid. These chemicals are so proportioned as to render the resultant substance substantially neutral, and by increasing the amount of sodium borate or sodium carbonate, the substances will become relatively harder or softer, respectively. If the amount of sodium borate is increased, the amount of sodium carbonate will be decreased; conversely, if the sodium carbonate is increased the sodium borate is decreased. A solution comprising sodium carbonate requires more malic acid per unit volume of the solution to neutralize the resultant compound, so that more malic acid per unit volume of the resultant compound is present, and this gives a softer compound.

It is obvious that various other chemical combinations may be used to fulfill the requirements set forth above and, as long as they are film forming in solution with the metals used, they will give results.

Whether the water retained in combination with the chemicals is in the form of water of crystallization or is held by a tenacious film, by surface tension, or otherwise, is immaterial as long as the resultant impregnating substance gives the results set forth. If the chemicals used are such that the resultant substance can crystallize, the condenser will contain a mass of crystals provided the solution was not heated too long or too much of its water given up. If the solution is heated beyond a certain point, insufficient water remains to enable the chemicals to crystallize out, and the resultant substance may take on the appearance of a smooth, glassy layer, relatively hard on the outside but comparatively soft and viscous within. This condition is particularly advantageous in this condenser as the substance appears to resist all normal tendencies to give up its water under operating conditions. Even when subjected to temperatures somewhat higher than normal, this water is tenaciously retained, thus insuring a long, useful life for the condenser.

Figure 5 shows a method of starting the condenser elements 1 to 4 on the mandrel 9 in making a wound condenser. The separating members 3 and 4 are advanced before the conducting foils 1 and 2 in order to separate the same and a similar precaution is observed when terminating the winding.

Fig. 6 shows a finished condenser 10 of the roll type imbedded in a suitable material 12, such as sand, gravel, pulverized cork, or the like, for maintaining the condenser in the center of the outer container 11. The container and imbedding substance are partially removed in order to show the completed condenser. It will be noted that a portion of the outer turn of strip 1 is cut and turned up, as shown at 13, in order to provide a terminal 14 for the condenser. The foil 2 is likewise turned up to form an opposite terminal 15 of the roll. Suitable binding members 16, which may be elastic bands, are used to prevent the condenser layers from loosening or unrolling. It will be noted that in this type of condenser the separating strips 3 and 4 are wider than the conductive strips or armatures; however, the particular method of winding the condenser does not form a part of my invention and many other types of windings may be used, such as where the electrodes or foils are staggered with respect to separating strips and extend from each end of the condenser to form terminals therefor. Insulated terminal leads 19 are brought through apertures in the cover 18 and are connected in any suitable manner to the terminals 14, 15 of the condenser body. An additional insulating plate 17 may be employed where the leads are brought through the cover.

Figure 7 shows diagrammatically a stack condenser made in accordance with my invention and it is obvious that either one or both of the sets of electrodes 1, 2 can be coated with a film 20 as desired, depending upon whether the condenser is to be used in direct or alternating current circuits.

While I have shown and described but one embodiment of my invention, many other and varied forms and uses will present themselves to those versed in the art without departing from my invention, and I do not wish to be limited either in structure or in use except as indicated by the terms and scope of the appended claims.

For brevity in the specification and claims, the terms "relatively hard" and "substantially solid" are used in a generic sense to define a compound which is either viscous or solid, and include both forms of the condenser, viz., the hard, generally crystalline form, and the form in which the chemical has a tenacious skin or hard outer layer with a relatively soft or viscous interior; and the terms "building" and "assembling" as used in the claims refer to winding, stacking, or otherwise arranging the electrode and separator members to produce a condenser body of the desired kind and shape.

I claim:

1. The method of making an electrical condenser which comprises causing a dielectric substance to be formed on the surfaces of at least one of a plurality of conductive elements, interposing a spacing means between said elements, immersing such assembly in a solution comprising a plurality of chemicals adapted to harden upon removal from the solution, removing the assembly from the solution and building a condenser of the desired shape therefrom.

2. The method of making an electrical condenser which comprises mixing a plurality of acid forming and base forming chemicals in such manner that the resultant mixture is substantially neutral, preparing a solution from said mixture, passing a plurality of conductive elements separated by a spacing element through said solution to impregnate the same, applying a forming current to at least one of the conductive elements to form a dielectric film thereon, and assembling a condenser of the desired shape therefrom.

3. The method of making an electrical condenser which comprises passing a plurality of conductive elements separated by a spacing element through an impregnating solution, simultaneously applying a forming current to at least one of the conductive elements in such manner as to form a dielectric film thereon, assembling a condenser body of the desired shape therefrom, and dipping said body in a compound to prevent loss of the impregnating material.

4. In the art of making a dry electrolytic condenser, the method which comprises preparing a solution of film forming inorganic base and organic acid chemicals and water, heating the solution beyond the point where the said chemicals would crystallize out when the solution cools so that, upon hardening in a condenser body, the resultant compound will be substantially non-crystalline with a tenacious outer layer and a relatively soft interior having water in combination therewith, and impregnating a condenser body with said solution.

5. In the art of making a dry electrolytic condenser, the method which comprises preparing a solution of at least one base forming chemical, malic acid and water, heating the solution to reduce the water content thereof and establish the relative proportions of said chemicals and water per unit volume such that, upon hardening in a condenser body, the resultant compound will be substantially non-crystalline with a tenacious outer skin and a relatively soft interior having water in combination therewith, and impregnating a condenser body with said solution.

6. In the art of making a dry electrolytic condenser, the method which comprises preparing a solution of at least one base forming chemical, malic acid and water, heating the solution to reduce the water content thereof until the concentration of the solution is such that, upon hardening in a condenser body, the resultant compound will be substantially non-crystalline with a tenacious outer skin and a relatively soft interior having water in combination therewith, and impregnating a condenser body with said solution.

7. In the art of making a dry electrolytic condenser, the method which comprises preparing a solution of film forming inorganic base and organic acid chemicals and water, establishing the relative proportions of said chemicals such that the resultant compound will be substantially chemically neutral and innocuous to the dielectric film on the condenser electrodes, heating the solution to reduce the water content thereof and establish the relative proportions of said chemicals and water per unit volume of said solution such that, upon hardening in a condenser body, the compound will be substantially non-crystalline with a tenacious outer layer and a relatively soft interior having water in combination therewith, and impregnating a condenser body with said solution.

8. An electrical condenser comprising electrodes of opposite polarity, at least one of which is composed of film forming material having a dielectric film formed thereon, said electrodes separated by a substantially solid conductive chemical compound having water in combination therewith adapted to renew said dielectric film, said compound comprising inorganic base and organic acid chemicals in such relative proportions that the compound is substantially chemically neutral and innocuous to the dielectric film.

9. An electrical condenser comprising electrodes of opposite polarity, at least one of which is composed of film forming material having a dielectric film formed thereon, said electrodes separated by a substantially solid conductive chemical compound having water in combination therewith adapted to renew said dielectric film, said compound comprising at least one base forming chemical and malic acid in such relative proportions that the compound is substantially chemically neutral and innocuous to the dielectric film.

10. An electrical condenser comprising electrodes of opposite polarity, at least one of which is composed of film forming material having a dielectric film formed thereon, said electrodes separated by a substantially solid conductive chemical compound having water in combination therewith adapted to renew said dielectric film, said compound comprising sodium borate and malic acid in such relative proportions that the compound is substantially chemically neutral and innocuous to the dielectric film.

11. An electrical condenser comprising electrodes of opposite polarity, at least one of which is composed of film forming material having a dielectric film formed thereon, said electrodes separated by a substantially solid conductive chemical compound having water in combination therewith adapted to renew said dielectric film, said compound comprising sodium borate, sodium carbonate and malic acid in such relative proportions that the compound is substantially chemically neutral and innocuous to the dielectric film.

12. An electrical condenser comprising electrodes of opposite polarity, at least one of which is composed of film forming material having a dielectric film formed thereon, said electrodes separated by a conductive chemical compound comprising inorganic base and organic acid chemicals having water in combination therewith adapted to renew said dielectric film, said chemicals and said water having such relative proportions that the compound has a hard outer layer and is relatively soft within.

13. An electrical condenser comprising electrodes of opposite polarity, at least one of which is composed of film forming material having a dielectric film formed thereon, said electrodes separated by a substantially solid conductive chemical compound comprising a base forming chemical and malic acid having water in combination therewith adapted to renew said dielectric film, said chemicals and said water in such relative proportions that the compound has a tenacious outer layer and a relatively soft interior.

14. An electrical condenser comprising electrodes of opposite polarity, at least one of which is composed of film forming material having a dielectric film formed thereon, said electrodes separated by a substantially solid conductive chemical compound comprising sodium borate and malic acid having water in combination therewith adapted to renew said dielectric film, said chemicals and said water in such relative proportions that the compound is substantially non-crystalline with a tenacious outer layer and a relatively soft interior.

15. An electrical condenser comprising electrodes of opposite polarity, at least one of which is composed of film forming material having a dielectric film formed thereon, said electrodes separated by a substantially solid conductive chemical compound comprising sodium borate, sodium carbonate and malic acid having water in combination therewith adapted to renew said dielectric film, said chemicals and said water in such relative proportions that the compound is substantially non-crystalline with a tenacious outer layer and a relatively soft interior.

16. An electrical condenser comprising electrodes of opposite polarity, at least one of which is composed of film forming material having a dielectric film formed thereon, said electrodes separated by a conductive chemical compound comprising inorganic base and organic acid chemicals having water in combination therewith, said chemicals in such relative proportions that the compound is substantially chemically neutral and innocuous to the dielectric film, said chemicals and said water in such relative proportions that the compound is substantially non-crystalline with a tenacious outer layer and a relatively soft interior.

In testimony whereof I affix my signature.

JOHN CLYDE DAVIDSON.